(12) United States Patent
Begdouri

(10) Patent No.: US 8,484,929 B1
(45) Date of Patent: Jul. 16, 2013

(54) CONSTRUCTION OF MODULAR UNDERGROUND STORAGE FACILITIES

(71) Applicant: Hamza Begdouri, Tampa, FL (US)

(72) Inventor: Hamza Begdouri, Tampa, FL (US)

(*) Notice: Subject to any disclaimer, the term of this patent is extended or adjusted under 35 U.S.C. 154(b) by 0 days.

(21) Appl. No.: 13/648,497

(22) Filed: Oct. 10, 2012

Related U.S. Application Data

(62) Division of application No. 12/842,172, filed on Jul. 23, 2010, now abandoned.

(60) Provisional application No. 61/235,537, filed on Aug. 20, 2009.

(51) Int. Cl.
  *E04B 1/00* (2006.01)
  *E04G 21/00* (2006.01)
  *E04G 23/00* (2006.01)

(52) U.S. Cl.
  USPC .......... 52/745.03; 52/79.7; 52/79.9; 52/79.12

(58) Field of Classification Search
  USPC .................. 52/79.7, 69.6, 79.8, 79.11, 79.12, 52/745.01–745.04, 79.9, 745.1, 745.13
  See application file for complete search history.

(56) References Cited

U.S. PATENT DOCUMENTS

| | | | | | |
|---|---|---|---|---|---|
| 3,750,366 | A | * | 8/1973 | Rich et al. | 52/79.11 |
| 3,925,679 | A | * | 12/1975 | Berman et al. | 290/1 R |
| 4,242,847 | A | * | 1/1981 | Rezin | 52/169.6 |
| 4,336,674 | A | * | 6/1982 | Weber | 52/169.6 |
| 4,599,829 | A | * | 7/1986 | DiMartino, Sr. | 52/79.7 |
| 4,607,467 | A | * | 8/1986 | Roux | 52/169.6 |
| 4,854,094 | A | * | 8/1989 | Clark | 52/79.1 |
| 6,332,303 | B1 | * | 12/2001 | Saito | 52/741.14 |
| 6,385,921 | B1 | * | 5/2002 | Evans | 52/169.9 |
| 2008/0134589 | A1 | * | 6/2008 | Abrams et al. | 52/79.1 |
| 2009/0064604 | A1 | * | 3/2009 | Yamaguchi | 52/169.6 |

* cited by examiner

*Primary Examiner* — Brian Glessner
*Assistant Examiner* — Brian D Mattei
(74) *Attorney, Agent, or Firm* — Nilay J. Choksi; Smith & Hopen, P.A.

(57) ABSTRACT

A method of constructing a subterranean storage facility formed by an array of abutting shipping containers. The inner side panels and structural bars of adjoining containers are removed to form an interstitial space defined by the remaining outer side panels of the array. The removed panels and bars are repurposed in the construction to provide an external shell and enhanced structural support.

14 Claims, 8 Drawing Sheets

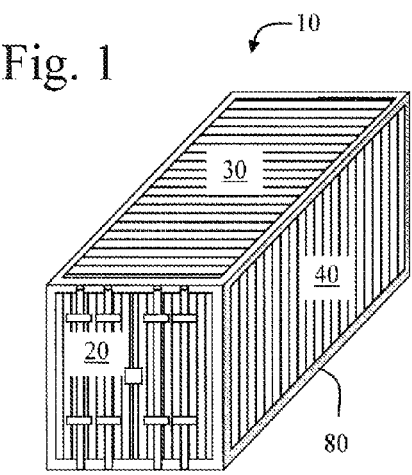
Fig. 1
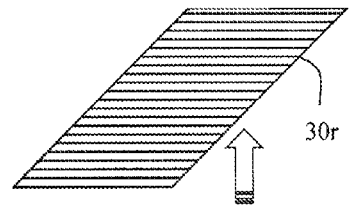
Fig. 2
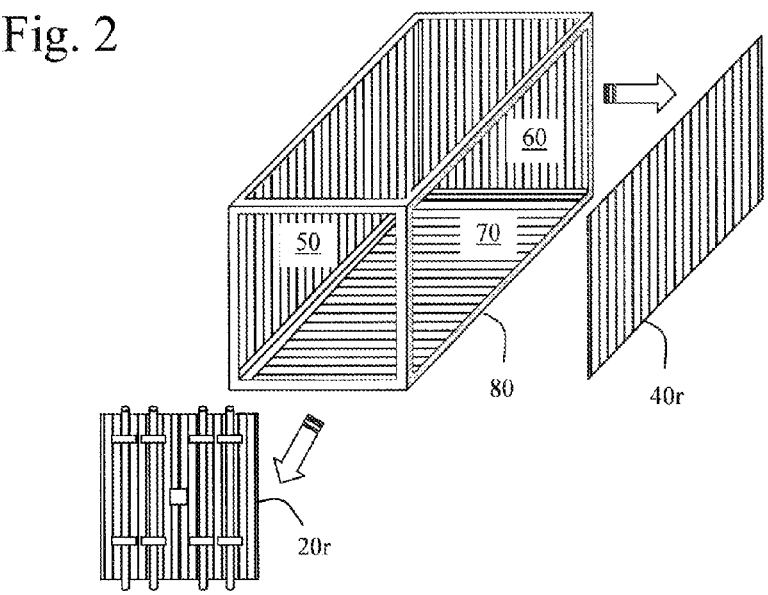

CONSTRUCTION OF MODULAR UNDERGROUND STORAGE FACILITIES

CROSS REFERENCE TO RELATED APPLICATION

This application is a divisional application of and claims priority to currently pending U.S. patent application Ser. No. 12/842,172, entitled "Modular Underground Storage Facility", filed on Jul. 23, 2010 by the same inventor, which claims priority to U.S. provisional patent application No. 61/235,537, entitled "MODULAR UNDERGROUND STORAGE FACILITY," filed on Aug. 20, 2009 by the same inventor, the contents each of which are hereby incorporated by reference.

BACKGROUND OF THE INVENTION

1. Field of the Invention

This invention relates to a thermally efficient underground storage facility and the corresponding low-cost method of modular construction.

2. Description of the Prior Art

Energy is one of the most valued and needed resources in the world. The energy needed to preserve perishable products (like meats, fruits, and vegetables) is substantial. Before most perishable products reach consumers, they are stored in above ground cooling facilities. Typically, above ground cooling facilities are subjected to a variety of external heat sources, such as the sun's radiation, the constant opening and closing of insulated doors, and heat from the surrounding area. Due to these heat sources, an immense amount of energy is used to maintain a cool temperature within the facility, which energy is very expensive.

Accordingly, what is needed is a thermally efficient storage facility that requires reduced energy to operate. However, in view of the prior art considered as a whole at the time the present invention was made, it was not obvious to those of ordinary skill in the art how the limitations of the art could be overcome.

SUMMARY OF INVENTION

The long-standing but heretofore unfulfilled need for a thermally efficient storage facility that requires a minimal amount of energy to operate is now met by a new, useful, and nonobvious invention.

The present invention provides subterranean storage formed by an array of abutting shipping containers. The inner side panels and structural bars of adjoining containers are removed to form an interstitial space defined by the remaining outer panels of the array. The array is welded together at the outer frame bars which are defined by the perimeter of the outer sides of each container. Structural bars which brace the panels are repurposed to reinforce load-bearing containers. The loads may be laterally imposed against the sides of the array or compressive against the top of the array.

The greater the number of containers in the array, the greater number of panels must be removed from adjoining containers to form an open interstitial space therebetween. The removed inner panels are repurposed to overlay external seams between abutting containers, thereby forming an external shell around the array. Insulation such as extruded polystyrene may be sandwiched between the outer panels of the array and the external shell.

Corrosion control methods may include, but are not limited to sacrificial anodes, impressive current, humidity control, and anti-corrosive paint.

A concrete flooring may be incorporated to act as a base for the storage facility.

In an alternate embodiment, a plurality of shipping containers is buried below the surface of the earth and arranged to form a hollow rectangular structure. The structure is supported by a plurality of support columns and beams disposed within the hollow rectangular structure.

BRIEF DESCRIPTION OF THE DRAWINGS

For a fuller understanding of the invention, reference should be made to the following detailed description, taken in connection with the accompanying drawings, in which:

FIG. 1 is an elevated isometric view of a shipping container;

FIG. 2 is an elevated, isometric, partially exploded view of the shipping container with several panels removed according to an embodiment of the invention;

DETAILED DESCRIPTION OF THE PREFERRED EMBODIMENT

Figure 3:
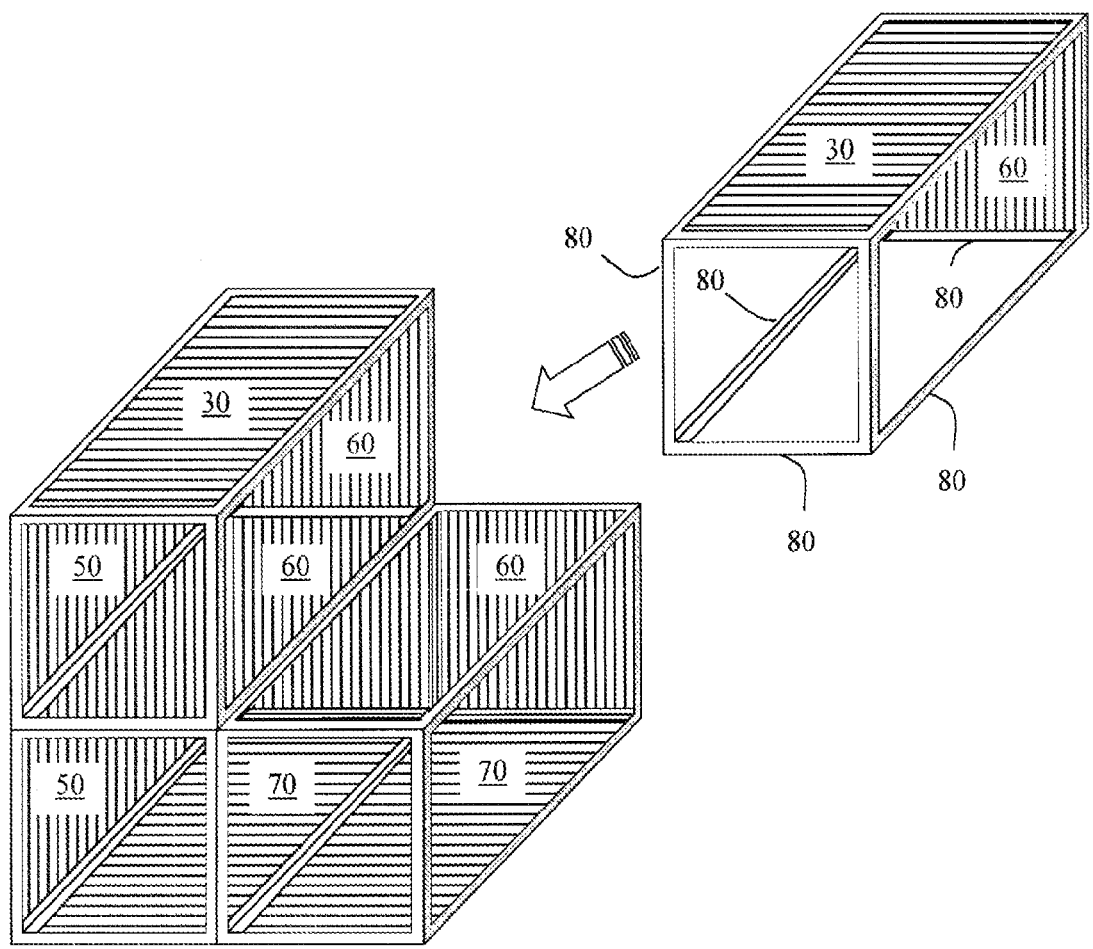
FIG. 3 is an elevated, isometric, view of an array of shipping containers assembled according to an embodiment of the invention.

An embodiment of this invention utilizes commercial size containers (40'×8'×10') aligned and stacked in every position necessary. In FIGS. 1-2, an exemplary view of container 10 is shown having front 20, top 30, right side 40, left side 50, rear 60 and bottom 70. The present invention provides for storage in greater volume that is possible with a single shipping container. In addition, the present invention provides a fabrication method that provides a substantially open storage volume rather than one that is compartmentalized. An open storage area facilitates the movement of items in, out and around the storage area. Furthermore, open storage areas may accommodate moving equipment such as a forklift that can provide greater efficiency to the storage operation. Accordingly, by necessity, the storage containers must be modified by removing at least one panel wall. A novel concept in the present invention is the repurposing of removed panels to facilitate and enhance the weathering and structural integrity of the storage facility. In FIG. 2, top 30 is removed to become repurposed top 30r. Right side 40 is removed to become repurposed right 40r. Front 20 is removed to become repurposed 20r. Left side 50, bottom 70, and rear 60 remain attached to frame bar 80.

Figure 4:
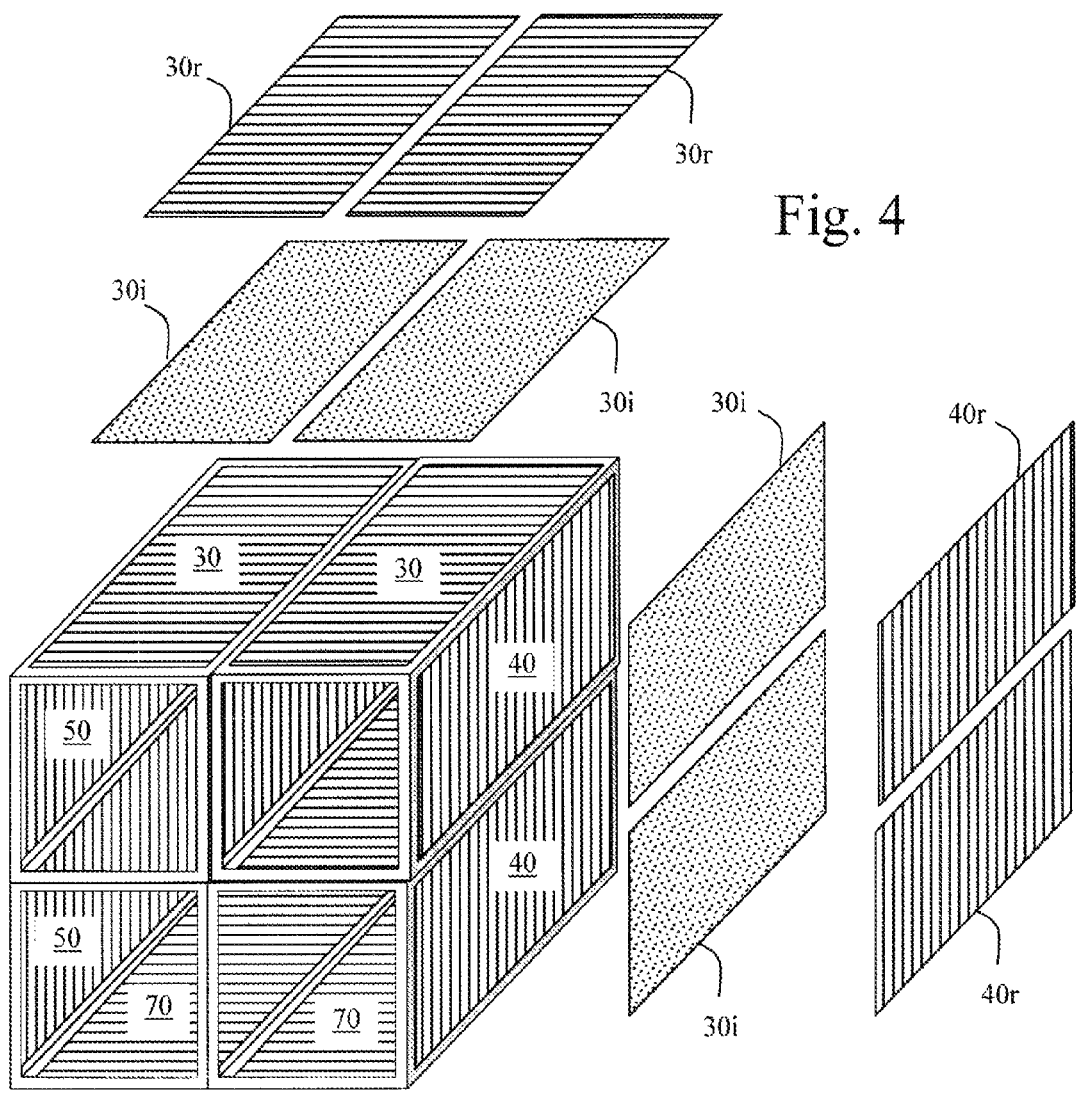
FIG. 4 is an elevated, isometric, partially exploded view of an array of shipping containers assembled and insulated according to an embodiment of the invention.

The abutting shipping containers are welded together along their respective rectangular structural frames. In FIG. 3, a plurality of containers 10 are affixed by welding along outer frame bar 80. In FIG. 4, four containers have been welded together.

The removed panels are repurposed to overlay external seams between abutting containers forming a subterranean external shell around the array of abutting shipping containers. In FIG. 4, repurposed panels 30r and 40r form a subterranean external shell around container panels 30 and 40, respectively.

Insulation may be disposed between the outer panels of the array of abutting shipping containers and the external shell, thereby providing enhanced weather protection, structural integrity and thermal efficiency. For example, still referring to FIG. 4, insulation panels 30i and 40i are sandwiched between container panels 30 and 40 and repurposed panels 30r and 40r, respectively.

Figure 5:
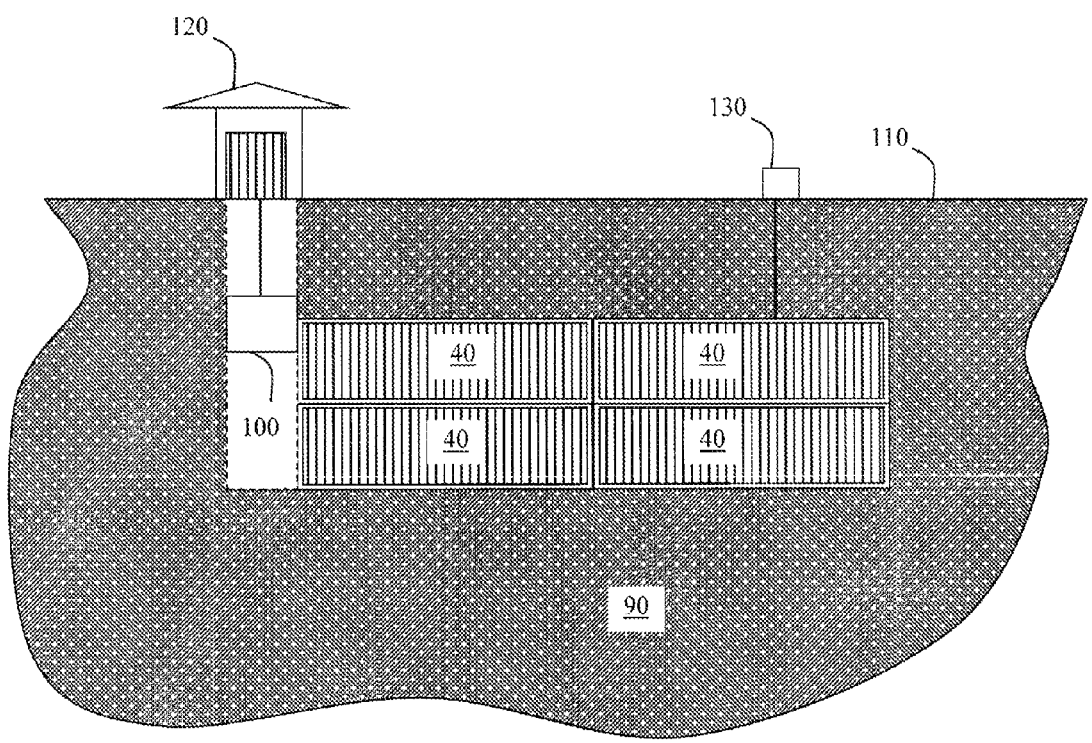
FIG. 5 is an elevated, partially sectional, side view of an installation of the storage according to an embodiment of the invention.

In FIG. 5, an array of containers is shown buried in ground 90. Elevator 100 connects the containers with surface 110 by elevator entrance 120. Any entrance and exit means may be used, including stairs or a ladder. Air conditioner 130 provides cooling or heating, or both, to the containers.

Figure 6:
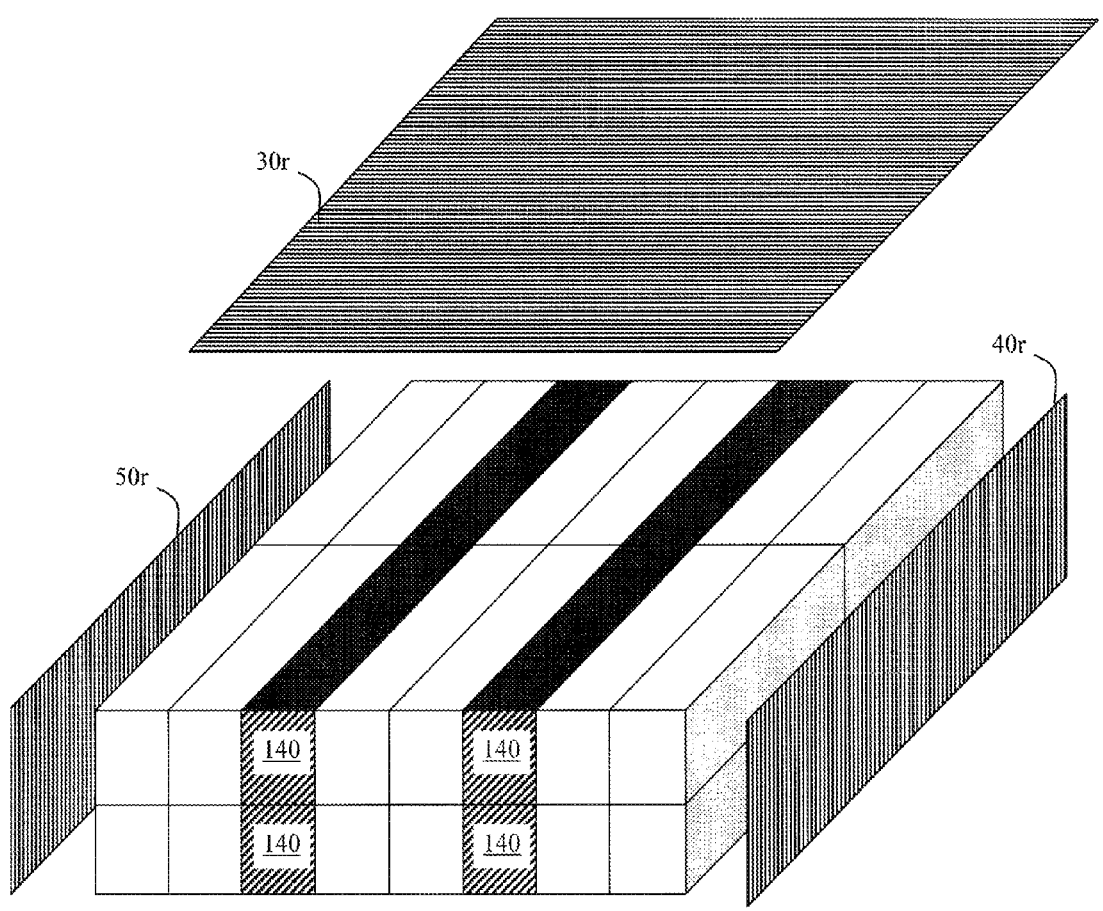
FIG. 6 is an elevated, isometric, partially exploded view of an array of shipping containers assembled according to an embodiment of the invention.

In FIG. 6, an exemplary embodiment of the invention is shown with 32 containers laid out 16 on top of 16. Hallway containers 140 provide access to a volume of approximately 76800 ft$^3$ (2840 m$^3$) using commercial size containers (40'× 8'×10'). Repurposed top 30r, repurposed left side 50r and repurposed right side 40r form an outer shell around the containers.

Figure 7:
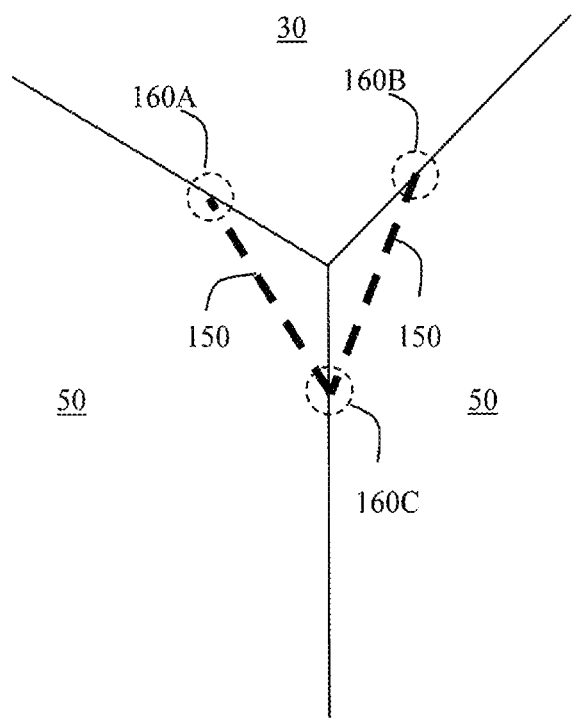
FIG. 7 is an elevated, isometric, partially sectional view of a structural bracing of a container's corner according to an embodiment of the invention.

In FIG. 7, structural bars 150 removed from panels 20-70 are repurposed to reinforce load-bearing container corners. Weld points 160A-C are exemplary.

To construct the subterranean storage facility, a plurality of shipping containers is provided. Each shipping container initially has a top panel, a bottom panel, a right panel, a left panel, a front panel, a back panel, and support bars formed around a rectangular structural frame. Next, the shipping panels are arranged in abutting fashion below the surface of the earth. The panels and the support bars of adjoining containers are removed to form an interstitial space defined by the remaining outer panels of the array of abutting shipping containers. Abutting shipping containers are then welded along their respective rectangular structural frames. The removed support bars may be repurposed to reinforce load-bearing containers. Similarly, the removed panels may be repurposed to overlay external seams between abutting containers to form a subterranean external shell around the array of abutting shipping containers. If an external shell is constructed, insulation may be disposed between the outer panels of the array of abutting shipping containers and the external shell. If necessary, a corrosion control may be applied to the storage facility selected from the group consisting of sacrificial anodes, impressive current, humidity control, and anti-corrosive paint. An AC unit or other temperature control means is used to maintain a cool temperature within the storage facility.

This invention provides the benefits of having an underground cooling facility as opposed to a standard above ground cooling building. Additional insulation may also be used in this underground cooling system. However, the energy needed to keep perishable goods from spoilage is much less. Moreover, due to its environmentally friendly design, the cooling facility provides maximum cooling with less energy consumption all while preserving the area's autonomy. It is unobtrusive, covered with grass or short plants. It is accessible through an elevator shaft, a covered tunnel or the like.

Figure 8:
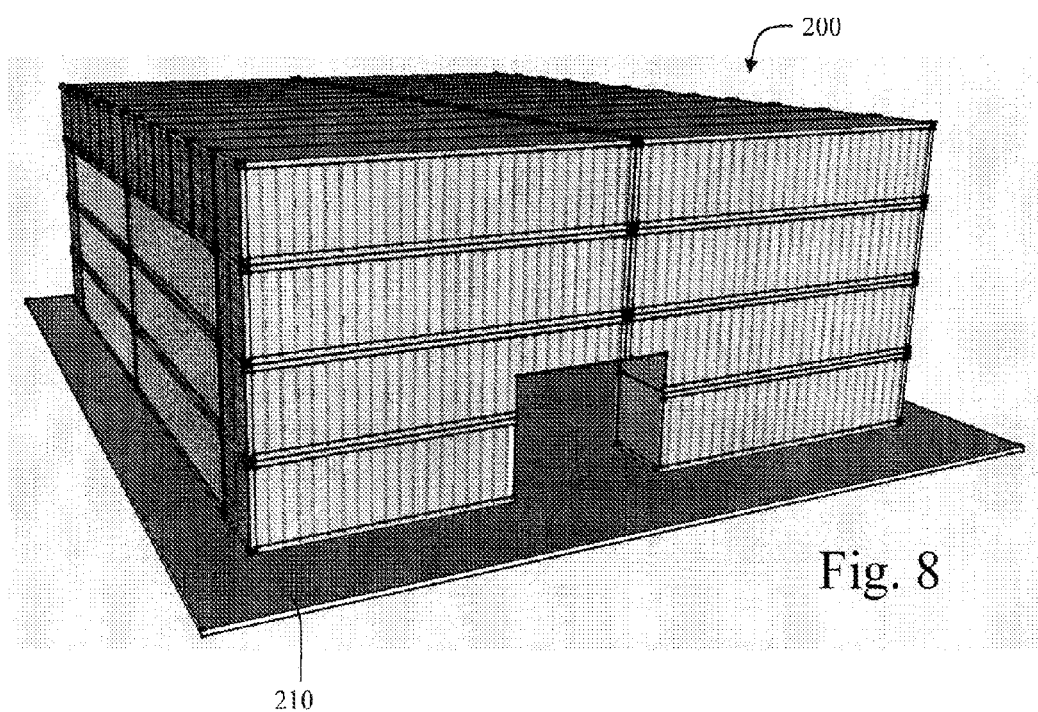
FIG. 8 is an isometric, partially sectional, side view of an alternate embodiment of a plurality of shipping containers arranged to form a hollow rectangular structure.
Figure 9:
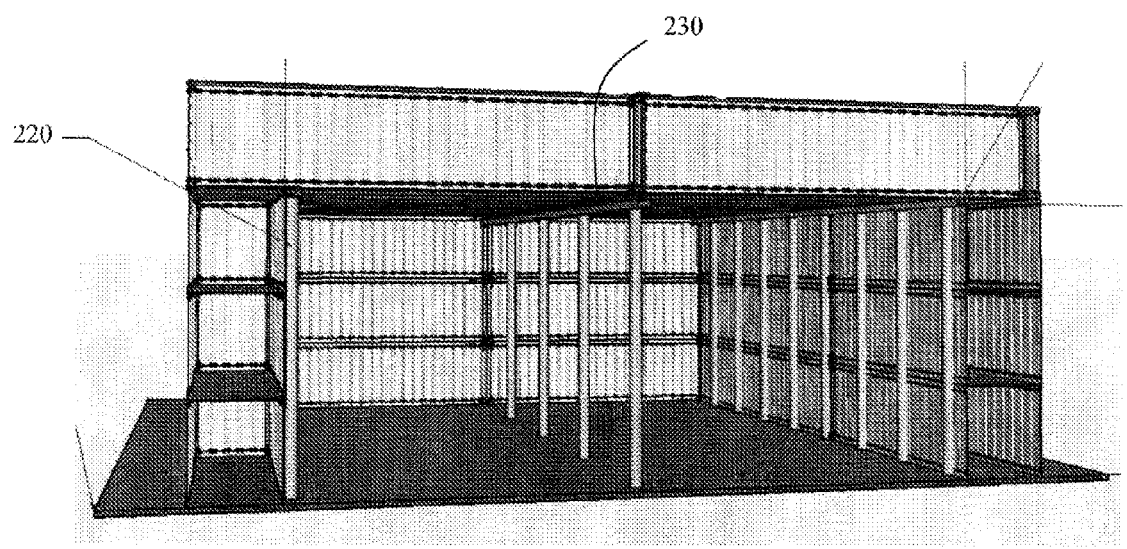
FIG. 9 is an elevated, isometric, view of an alternate embodiment of a plurality of shipping containers arranged to form a hollow rectangular structure.

In an alternate embodiment, as shown in FIGS. 8 and 9, the subterranean storage facility includes a plurality of shipping containers 10 buried below the surface of the earth and arranged to form hollow rectangular structure 200. The shipping containers form the outer walls of the hollow rectangular structure. Concrete flooring 210 is included to form a base for the structure. The inner storage space of the structure is supported by plurality of support columns 220 and plurality of support beams 230 disposed within the hollow rectangular structure. An opening is included along a side of the structure for entering and exiting the facility. In this embodiment, the storage containers may be filled with insulation. This embodiment may also be constructed above ground.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method of constructing a thermally efficient subterranean storage facility, comprising the steps of:
    providing an array of shipping containers, each shipping container of said array of shipping containers having a top panel, a bottom panel, a right panel, a left panel, a front panel, a back panel, and a rectangular structural frame;
    arranging said array of shipping containers in abutting relation to one another below the surface of the earth, said array of shipping containers including a plurality of outer panels and a plurality of internal panels, said plurality of outer panels forming outer spatial confines of said subterranean storage facility, each internal panel of said plurality of internal panels having outer edges in alignment with and parallel to respective outer edges of another internal panel of said plurality of internal panels;
    removing said plurality of internal panels of adjoining containers to form an interstitial space defined by said outer spatial confines as formed by said plurality of outer panels; and
    re-purposing said plurality of internal panels to form a subterranean external shell around said array of abutting shipping containers by overlaying said removed plurality of internal panels over external seams between said array of abutting shipping containers, whereby said subterranean external shell enhances the weather protection and structural integrity of said storage facility,
    whereby said storage facility encloses a substantially non-compartmentalized volume.

2. A method of constructing a thermally efficient subterranean storage facility as in claim 1, further comprising the step of:
    welding said array of abutting shipping containers along their respective rectangular structural frames.

3. A method of constructing a thermally efficient subterranean storage facility as in claim 1, further comprising the step of:
    disposing said removed support bars in a manner to reinforce containers from said array of shipping containers that are load-bearing.

4. A method of constructing a thermally efficient subterranean storage facility as in claim 3, further comprising:

welding said removed support bars to reinforce the corners of said array of shipping containers that are load-bearing.

5. A method of constructing a thermally efficient subterranean storage facility as in claim 1, further comprising the step of:
disposing insulation between said subterranean external shell and said plurality of remaining outer panels of said array of abutting shipping containers,
whereby said insulation enhances weather protection, structural integrity, and thermal efficiency of said storage facility.

6. A method of constructing a thermally efficient subterranean storage facility as in claim 1, further comprising the step of:
applying a corrosion control to said array of abutting shipping containers, said corrosion control selected from the group consisting of sacrificial anodes, impressive current, humidity control, and anti-corrosive paint.

7. A method of constructing a thermally efficient subterranean storage facility as in claim 1, further comprising the step of:
disposing a cooling unit within said storage facility to maintain a cool temperature within said storage facility.

8. A method of constructing a thermally efficient subterranean storage facility as in claim 1, further comprising the step of:
providing an entrance and exit to said storage facility.

9. A method of constructing a thermally efficient subterranean storage facility as in claim 1, further comprising the step of:
coupling an entrance and exit means to said storage facility, said entrance and exit means selected from a group consisting of an elevator, stairs, tunnel, and a ladder.

10. A method of constructing a thermally efficient subterranean storage facility, said subterranean storage facility having a left wall, a right wall, a rear wall, and at least a partial front wall, wherein each wall of said left, right, rear, and partial front walls has a hollow interior, comprising the steps of:
providing a first array of shipping containers having a first array of hollow interiors therewithin;
arranging said first array of shipping containers in stacked, abutting relation, such that said first array of interiors forms said hollow interior of said left wall;
providing a second array of shipping containers having a second array of hollow interiors therewithin;
arranging said second array of shipping containers in stacked, abutting relation, such that said second array of interiors forms said hollow interior of said right wall;
providing a third array of shipping containers having a third array of hollow interiors therewithin;
arranging said third array of shipping containers in stacked, abutting relation, such that said third array of interiors forms said hollow interior of said rear wall;
positioning said partial front wall and said first, second, and third arrays of shipping containers in a rectangular formation below the surface of the earth to form an open space defined by said partial front wall, said first array of shipping containers, said second array of shipping containers, and said third array of shipping containers;
disposing a roof member in overlying relation to said partial front wall, said first array of shipping containers, said second array of shipping containers, and said third array of shipping containers to enclose said open space.

11. A method of constructing a thermally efficient subterranean storage facility as in claim 10, further comprising the step of:
disposing a plurality of support columns and beams within said hollow rectangular structure to support an inner storage space of said hollow rectangular structure.

12. A method of constructing a thermally efficient subterranean storage facility as in claim 10, further comprising the step of:
disposing a concrete flooring at the base of said hollow rectangular structure.

13. A method of constructing a thermally efficient subterranean storage facility as in claim 10, further comprising the step of:
disposing an entrance and exit hole along a side of said hollow rectangular structure.

14. A method of constructing a thermally efficient subterranean storage facility as in claim 10, further comprising the step of:
disposing insulation within at least a portion of said array of shipping panels,
whereby said insulation enhances weather protection, structural integrity, and thermal efficiency of said storage facility.

* * * * *